(12) United States Patent
Sowa et al.

(10) Patent No.: US 12,078,199 B2
(45) Date of Patent: Sep. 3, 2024

(54) SELF-PUNCHING FUNCTIONAL ELEMENT, COMPONENT ASSEMBLY AND METHOD OF MANUFACTURING A COMPONENT ASSEMBLY

(71) Applicant: PROFIL Verbindungstechnik GmbH & Co. KG, Friedrichsdorf (DE)

(72) Inventors: Christian Sowa, Mühlheim/Main (DE); Amer Mahlme, Bad Homburg (DE); Tobias Jene, Friedrichsdorf (DE)

(73) Assignee: PROFIL Verbindungstechnik GmbH & Co. KG, Friedrichsdorf (DE)

( * ) Notice: Subject to any disclaimer, the term of this patent is extended or adjusted under 35 U.S.C. 154(b) by 322 days.

(21) Appl. No.: 17/580,925

(22) Filed: Jan. 21, 2022

(65) Prior Publication Data

US 2022/0235811 A1     Jul. 28, 2022

(30) Foreign Application Priority Data

Jan. 22, 2021    (DE) .......................... 102021101366.6

(51) Int. Cl.
| | | |
|---|---|---|
| *F16B 39/00* | (2006.01) | |
| *F16B 35/06* | (2006.01) | |
| *F16B 39/282* | (2006.01) | |

(52) U.S. Cl.
CPC ............ *F16B 35/06* (2013.01); *F16B 39/282* (2013.01)

(58) Field of Classification Search
CPC ............................... F16B 35/06; F16B 39/282
USPC .......................................... 411/179, 180, 181
See application file for complete search history.

(56) References Cited

U.S. PATENT DOCUMENTS

| | | | |
|---|---|---|---|
| 3,014,609 A * | 12/1961 | Hobbs ................... | B23P 19/062 29/512 |
| 4,555,838 A | 12/1985 | Muller | |
| 7,160,047 B2 * | 1/2007 | Mueller ............... | F16B 37/068 411/181 |
| 7,988,394 B2 * | 8/2011 | Babej .................... | F16B 37/062 411/181 |
| 2004/0076489 A1 | 4/2004 | Ladouceur | |
| 2005/0025605 A1 * | 2/2005 | Vrana ................... | F16B 17/006 411/181 |
| 2005/0158143 A1 | 7/2005 | Ladouceur | |

(Continued)

FOREIGN PATENT DOCUMENTS

| | | |
|---|---|---|
| DE | 3447006 C2 | 6/1988 |
| DE | 102016119479 A1 | 4/2018 |

(Continued)

*Primary Examiner* — Gary W Estremsky
(74) *Attorney, Agent, or Firm* — Gregory J. Gore, Esq.

(57) ABSTRACT

A self-punching functional element serves for fastening to a workpiece, in particular to a high-strength sheet metal part, and comprises a functional section; and a fastening section that has a contact surface for an engagement of a setting device, an end face remote from the contact surface, and an outer peripheral surface connecting the contact surface and the end face. The end face is radially outwardly bounded by a punching edge for punching a slug out of the workpiece, and at least one projection is provided at the outer peripheral surface adjacent to the contact surface, said projection rising from the outer peripheral surface in a radial direction and extending further outwardly in the radial direction than the punching edge.

23 Claims, 6 Drawing Sheets

(56) References Cited

U.S. PATENT DOCUMENTS

| | | | |
|---|---|---|---|
| 2010/0129173 A1* | 5/2010 | Babej | F16B 37/065 |
| | | | 411/173 |
| 2011/0038687 A1* | 2/2011 | Babej | F16B 17/006 |
| | | | 411/501 |
| 2018/0094660 A1* | 4/2018 | Mayer | F16B 19/086 |
| 2022/0112914 A1* | 4/2022 | Diehl | F16B 19/1063 |

FOREIGN PATENT DOCUMENTS

| | | |
|---|---|---|
| EP | 2302234 B1 | 6/2010 |
| EP | 2412991 B1 | 7/2011 |
| WO | 2005017369 A2 | 2/2005 |

* cited by examiner

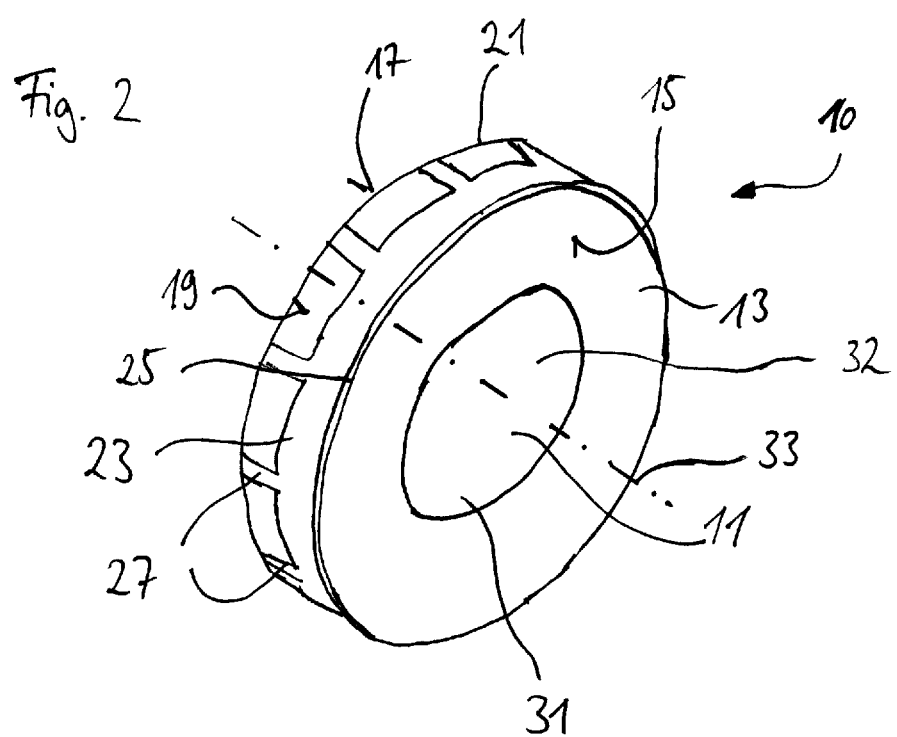

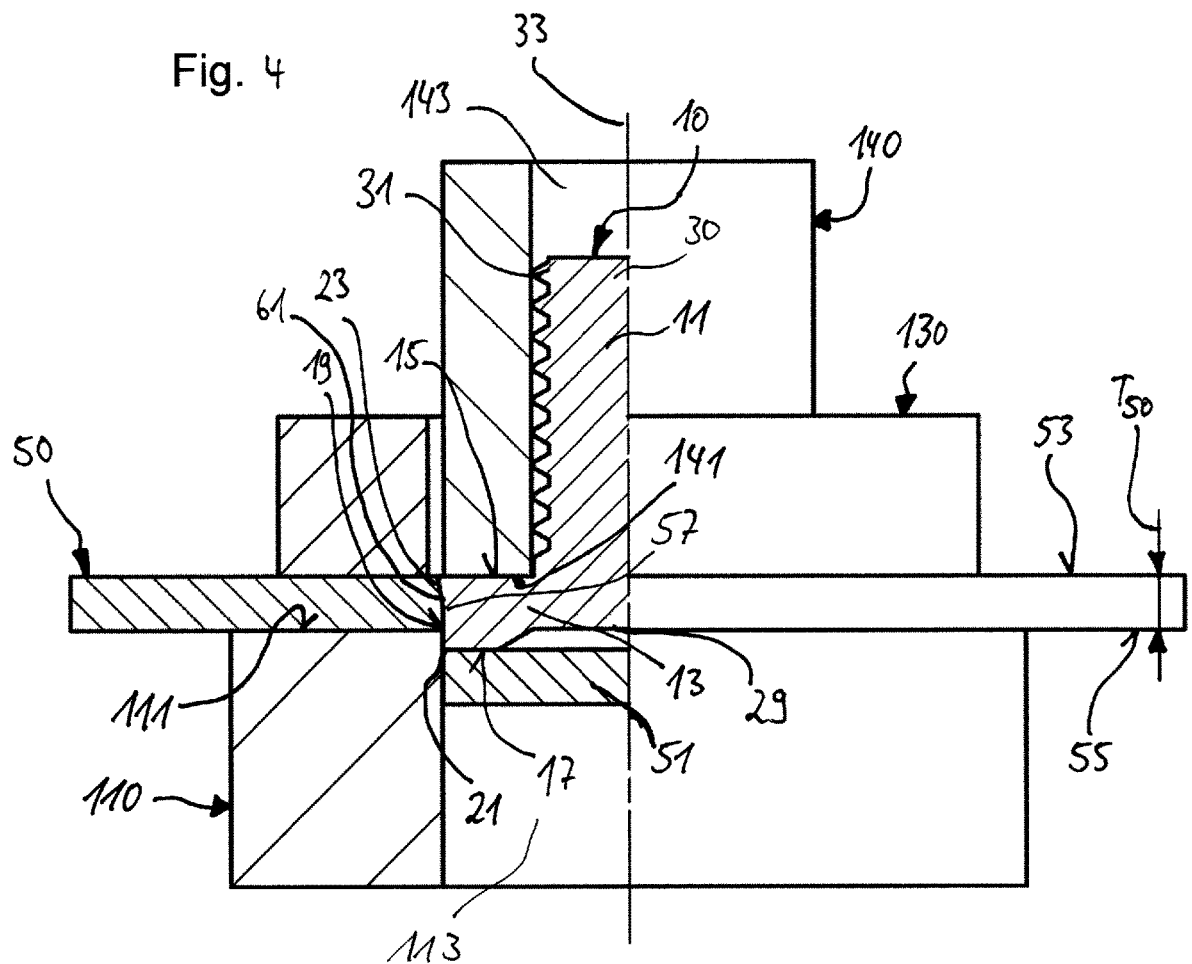

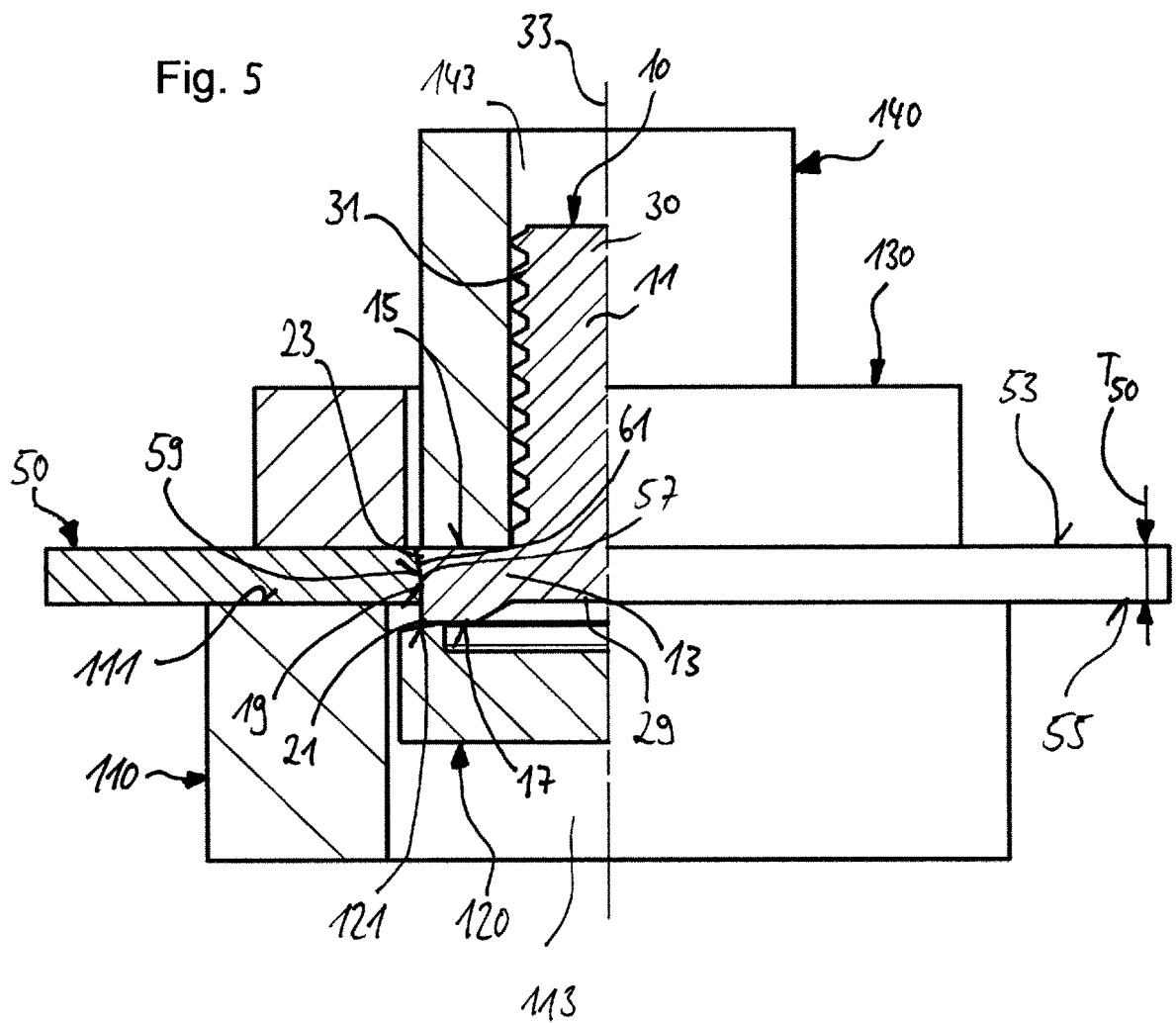

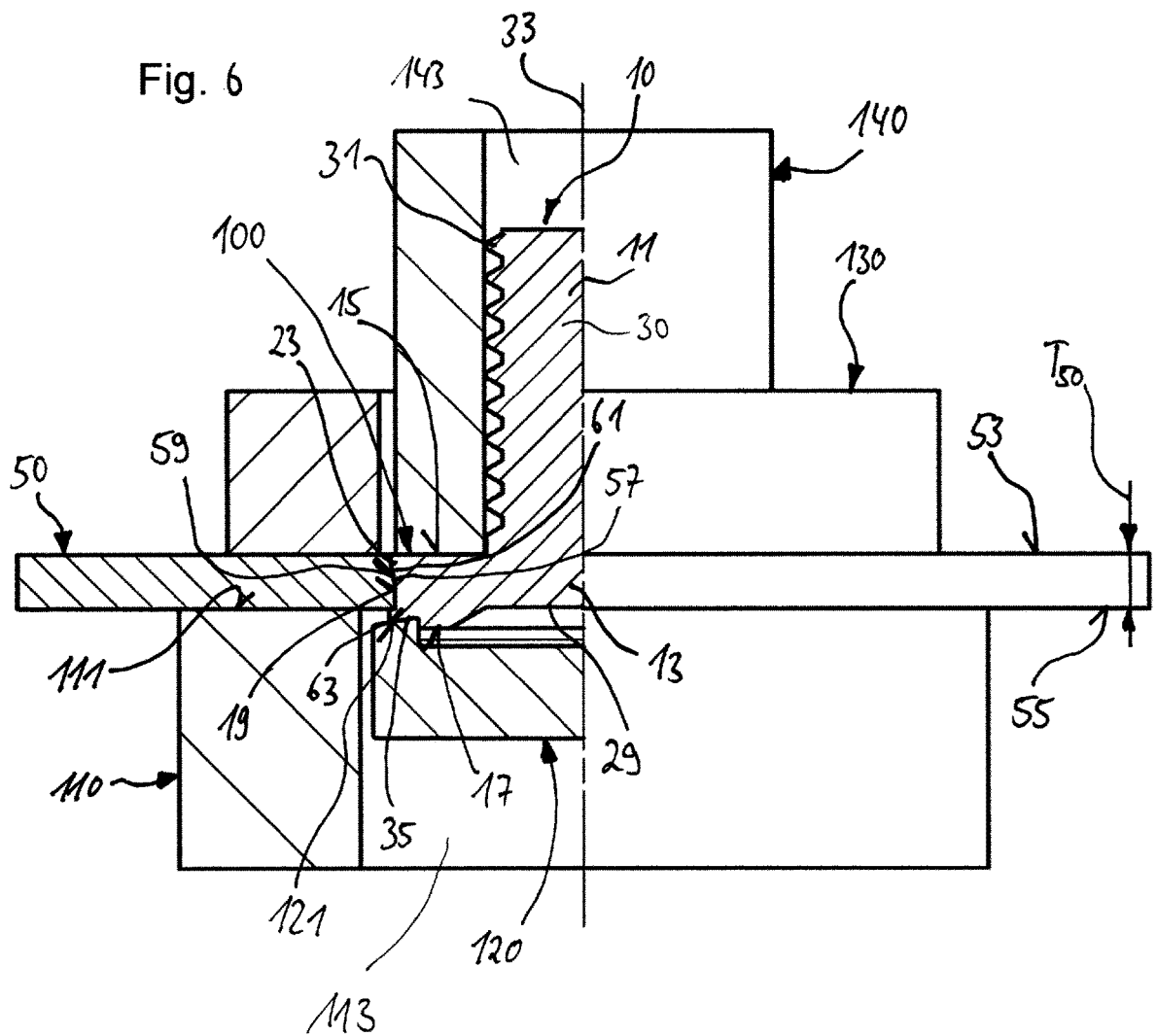

SELF-PUNCHING FUNCTIONAL ELEMENT, COMPONENT ASSEMBLY AND METHOD OF MANUFACTURING A COMPONENT ASSEMBLY

The invention relates to a self-punching functional element for fastening to a workpiece, in particular to a high-strength sheet metal part, to a component assembly that comprises a workpiece and a functional element, and to a method of manufacturing a component assembly.

Such functional elements usually have a functional section that in turn serves to fasten further components. They are widely used in the automotive industry, among others.

Functional elements can be bolt elements, whose shaft can be provided with a thread, or nut elements that can, for example, have an internal thread.

Functional elements are known in different designs. On the one hand, there are, for example, rivet elements that have a rivet section that is deformed on the attachment to a sheet metal part to form a rivet bead and to form a ring-shaped receiver for the margin of a hole in the sheet metal part with the head part. With such rivet elements, the functional element is therefore deformed on the attachment to the sheet metal part. Furthermore, press-in elements are known in which the element itself is not intentionally deformed on the attachment to a sheet metal part, but the sheet metal material itself is deformed to bring it into engagement with undercuts of the respective press-in element.

To establish connections between a functional element and a workpiece, weld connections are often used, in particular if the workpiece is a high-strength sheet metal part. Workpieces (sheet metal parts) are designated as "high-strength" that have a strength of more than 1200 MPa, in particular approximately 1500 MPa to 1900 MPa, and that generally consist of high-strength steel. However, high-strength steel is difficult to weld.

Alternatively to welding, functional elements can be inserted into the workpieces during the press hardening. However, this requires a very high level of tooling technology and a homogeneous temperature control of the workpiece.

It is an object of the present invention to provide a functional element and a component assembly that enable a secure and stable connection with little effort and for different workpiece thicknesses.

This object is satisfied by the subjects of the independent claims. Advantageous embodiments are the subject of the dependent claims and are indicated in the description and the drawings.

A self-punching functional element in accordance with a first aspect of the invention serves for fastening to a workpiece, in particular to a high-strength sheet metal part, and comprises a functional section; and a fastening section that has a contact surface for an engagement of a setting device, an end face remote from the contact surface, and an outer peripheral surface connecting the contact surface and the end face. The end face is radially outwardly bounded by a punching edge for punching a slug out of the workpiece. At least one projection is provided at the outer peripheral surface adjacent to the contact surface, said projection rising from the outer peripheral surface in a radial direction and extending further outwardly in the radial direction than the punching edge.

The functional element in accordance with the invention is suitable for being pressed into a workpiece, in particular into a high-strength sheet metal part. Since the functional element is provided with a punching edge, the pre-punching of the workpiece is obsolete. On the pressing of the functional element into the workpiece, a slug is punched out of the workpiece by means of the punching edge and the functional element is pressed into the punched hole thus arising in the workpiece by means of the fastening section. The projection in so doing brings about an undercut acting in the axial direction such that the functional element is securely held in the workpiece.

The functional element typically consisting of steel can in particular be a bolt element or a nut element. In this respect, a shaft of the press-in bolt preferably has an external thread and forms the functional section in this manner. The nut element, in contrast, preferably has an internal thread that forms the functional section. Instead of the threads, other features can also be provided that are, for example, suitable for fastening a further component or for providing another functionality. The functional section can also be sectionally or completely formed as a smooth pin or a smooth hole. The fastening section is the section of the functional element with which the functional element is fastened to the workpiece.

The workpiece can in particular be a high-strength workpiece, for example a high-strength sheet metal part, composed of high-strength steel. The workpiece can have a strength of 1200 MPa or more, 1500 MPa or more, or 1800 MPa or more, in particular approximately 1500 MPa to 1900 MPa. The strength of the functional element usually amounts to a maximum of 1000 MPa or a maximum of 900 MPa.

The projection is expediently conical and/or, viewed relative to a longitudinal axis of the functional element, has an at least sectionally curved and/or slanted course. The projection can thereby be dimensioned such that the pressing in is not made unnecessarily difficult and such that the desired effect of the undercut produced still exists at the intended pressing-in depth into the workpiece.

A maximum radial extent of the projection is preferably arranged adjacent to or adjoining a transition to the contact surface. Thus, it can, for example, be achieved that the contact surface ends approximately flush with a surface of the workpiece after the pressing in.

In an advantageous embodiment, the projection has an axial extent that corresponds to approximately 30% to 60%, in particular approximately 35% to 45%, of an axial extent of the fastening section. It has been found that an optimum result can in this respect be achieved in which the press-in process is not made unnecessarily difficult and a secure hold is nevertheless achieved by the undercut.

The self-punching functional element can further have at least one feature providing security against rotation that is formed at the outer peripheral surface and that is preferably configured as a web that rises from the outer peripheral surface and that extends in an axial direction. After the pressing in, the feature providing security against rotation counteracts a torque acting on the functional element in the peripheral direction, for example, when a torque is introduced via the functional section during the assembly of a further component.

The feature providing security against rotation can preferably merge into the projection. In this respect, a radial extent of the feature providing security against rotation can advantageously substantially correspond to a maximum radial extent of the projection. It is further possible that the feature providing security against rotation is provided at the projection.

To increase the resistance to a torque in the peripheral direction of the functional element, a plurality of features providing security against rotation can expediently be provided that are arranged distributed, in particular uniformly distributed, in a peripheral direction at the outer peripheral surface. The securities against rotation can preferably be aligned in parallel with one another and/or can be oriented perpendicular to the peripheral direction.

The contact surface and/or the end face can preferably be ring-shaped. The width of the end face ring is preferably greater than 70%, greater than 80%, or greater than 90% of the axial extent of the fastening section or of the axial extent of the outer peripheral surface. The width of the end face ring can in particular also be equal to or greater than the axial extent, for example more than 100%, more than 150%, or more than 200% of the axial extent. An outer diameter of the punching edge (the maximum outer diameter in the case of a non-circular design) preferably amounts to more than 300%, more than 400%, more than 500%, or more than 600% of the axial extent of the fastening section or of the axial extent of the outer peripheral surface.

The end face preferably has a recess that is in particular centrally arranged. This benefits a displacement of material at the end face that can in particular be effected by means of a die plunger to produce a second undercut described in more detail later.

In an advantageous embodiment, the fastening section and/or the punching edge has/have a geometry that deviates from a circular shape. A polygonal, oval, or square geometry can in particular be considered. Such a shape effects a security against rotation of the fastening section in the workpiece in the peripheral direction in addition to the features providing security against rotation described above or as a sole security against rotation.

The projection can in particular be continuous in the peripheral direction in order to achieve an undercut that is as effective as possible and thereby to achieve a secure connection between the workpiece and the functional element.

Alternatively thereto, at least two projections arranged separately from one another in the peripheral direction can be provided, whereby an automatic security against rotation in the peripheral direction is effected after the pressing in. For example, a plurality of uniformly distributed projections can be arranged in the peripheral direction and can be formed in the same manner or differently in cross-section.

The functional section is preferably provided with a thread or a latch device. As already indicated, a bolt element is in this respect generally an external thread; however, it is also conceivable that the bolt element has a hollow shaft having an internal thread. In the case of a nut element, the thread is an internal thread.

In accordance with a further aspect, the invention relates to a component assembly that has a workpiece, in particular a high-strength sheet metal part, having a first surface, a second surface disposed opposite the first surface, and a punched hole that forms an inner peripheral surface. A self-punching functional element in accordance with at least one of the above-described embodiments is pressed into the punched hole while separating a punching slug such that the outer peripheral surface of the functional element contacts the inner peripheral surface of the punched hole and the projection engages into the first surface of the workpiece or cooperates therewith such that a first undercut acting in the axial direction is provided. Displaced material of the fastening section forms a second undercut that engages around the workpiece at the second surface to secure the functional element to the workpiece.

Due to the two undercuts acting in the axial direction, a secure hold of the functional element in the sheet metal part is achieved, wherein a pre-punching of the workpiece can be omitted. The formation of the second undercut is in this respect only possible after the pressing in, in particular by means of a die plunger, whereby a large range of possible workpiece thicknesses can be covered.

In an advantageous embodiment, the contact surface is aligned approximately flush with the first surface.

The fastening section can have a depression at the end face, from which depression the second undercut extends outwardly in the radial direction. The depression is in particular produced by the engagement of a tool, for example the die plunger, at the end face such that the material of the fastening section is radially outwardly displaced from there to form the second undercut.

To be able to form the second undercut, the fastening section advantageously has an axial extent that is greater than the thickness of the workpiece.

In accordance with a further aspect, the invention relates to a method of manufacturing the component assembly, said method comprising the steps:

providing a self-punching functional element in accordance with the invention;

providing a workpiece, in particular a high-strength sheet metal part, that is not pre-punched at least in a region that is provided for fastening the functional element;

pressing the end face of the functional element against the workpiece such that a punched slug is separated from the workpiece by the punching edge while forming a punched hole, wherein the functional element is pressed into the workpiece at least until the projection enters into engagement with the first surface of the workpiece and/or with the inner peripheral surface of the punched hole to form the first undercut; and reshaping the fastening section at least in a region adjacent to the punching edge to form the second undercut, in particular while engaging into the end face.

The functional element can expediently be pressed against the workpiece by a setting device that acts on the contact surface of the functional element.

Furthermore, a downholder can preferably be provided by which the second surface of the workpiece is pressed against a contact surface of a die to securely hold the workpiece during the pressing process.

A die plunger is preferably provided that is pressed against the end face of the fastening section to reshape the fastening section.

A further downholder can be provided that fixedly holds the functional element in the axial direction during the pressing against of the die plunger. For example, the downholder engages at the contact surface. The setting device can also act as a downholder, for example, if the reshaping takes place immediately after the pressing in.

The die plunger preferably has a reshaping surface that diverges, viewed from the end face, to urge material of the fastening section radially outwardly in order to form the second undercut in this manner.

The invention will be explained purely by way of example in the following with reference to advantageous embodiments. In the drawings, which schematically illustrate the embodiments, FIG. 1*a* shows a perspective view of a functional element configured as a bolt element in accordance with an embodiment example;

FIG. 1*b* shows a further perspective view of the functional element from FIG. 1;

FIG. 2 shows a perspective view of a functional element configured as a nut element in accordance with an embodiment example;

FIG. 4 shows a cross-sectional view of a functional element and of a workpiece during a further method step in which a punched hole is formed by pressing the functional element against the workpiece and a punched slug is separated from the workpiece;

FIG. 5 shows a cross-sectional view of a functional element and of a workpiece during a further method step in which a die plunger engages at the end face of the fastening section; and FIG. 6 shows a cross-sectional view of a functional element and of a workpiece during a further method step in which an undercut is formed at the fastening section by means of the die plunger.

Figure 1A:
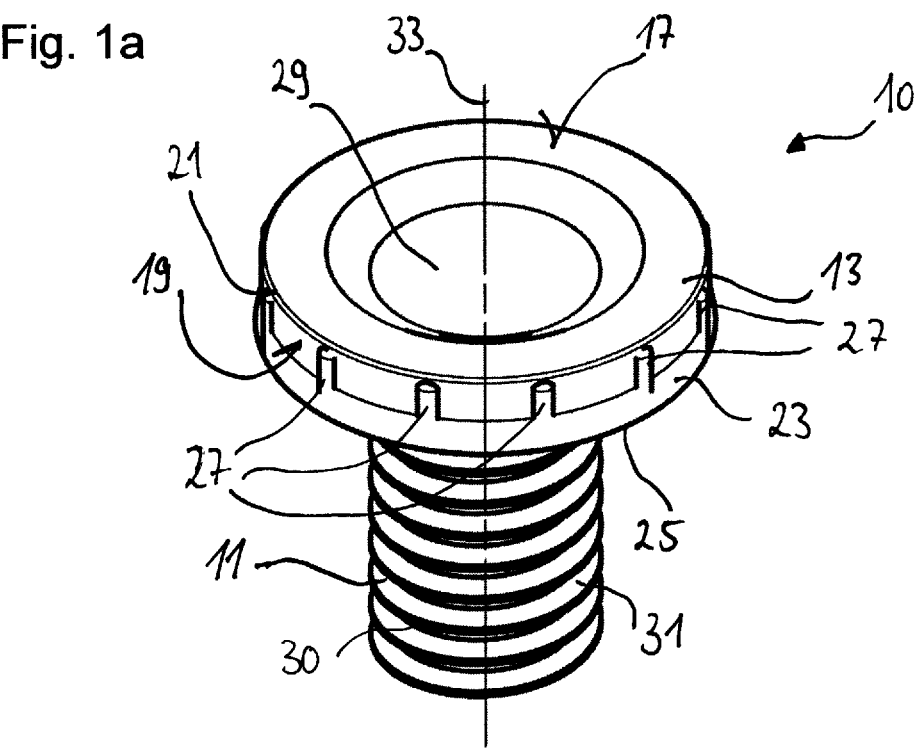
Figure 1B:
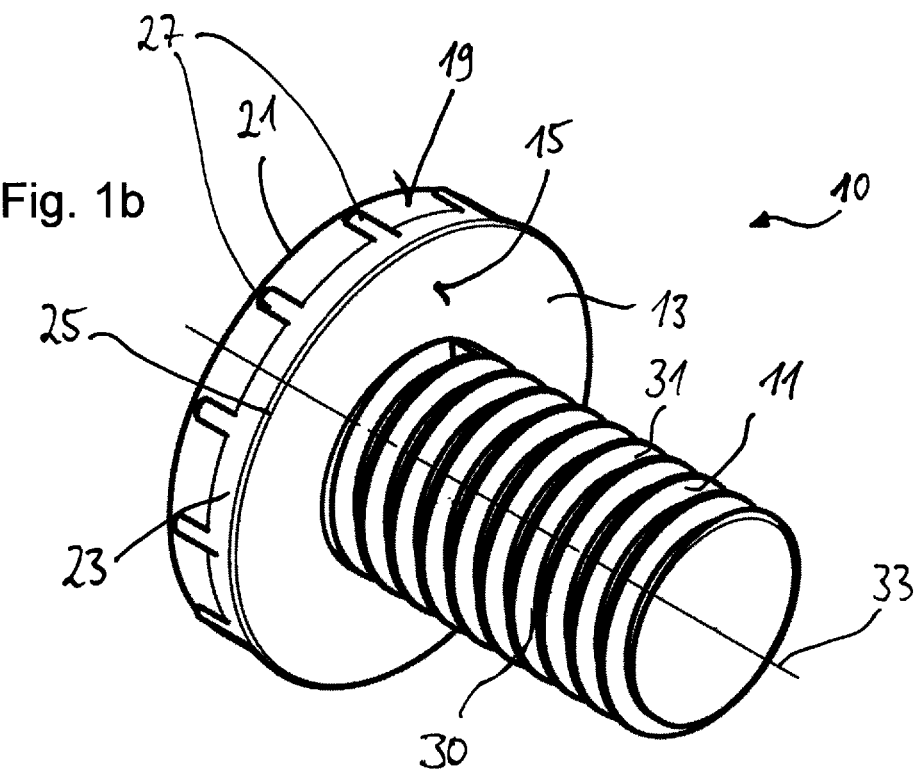
Figure 3:
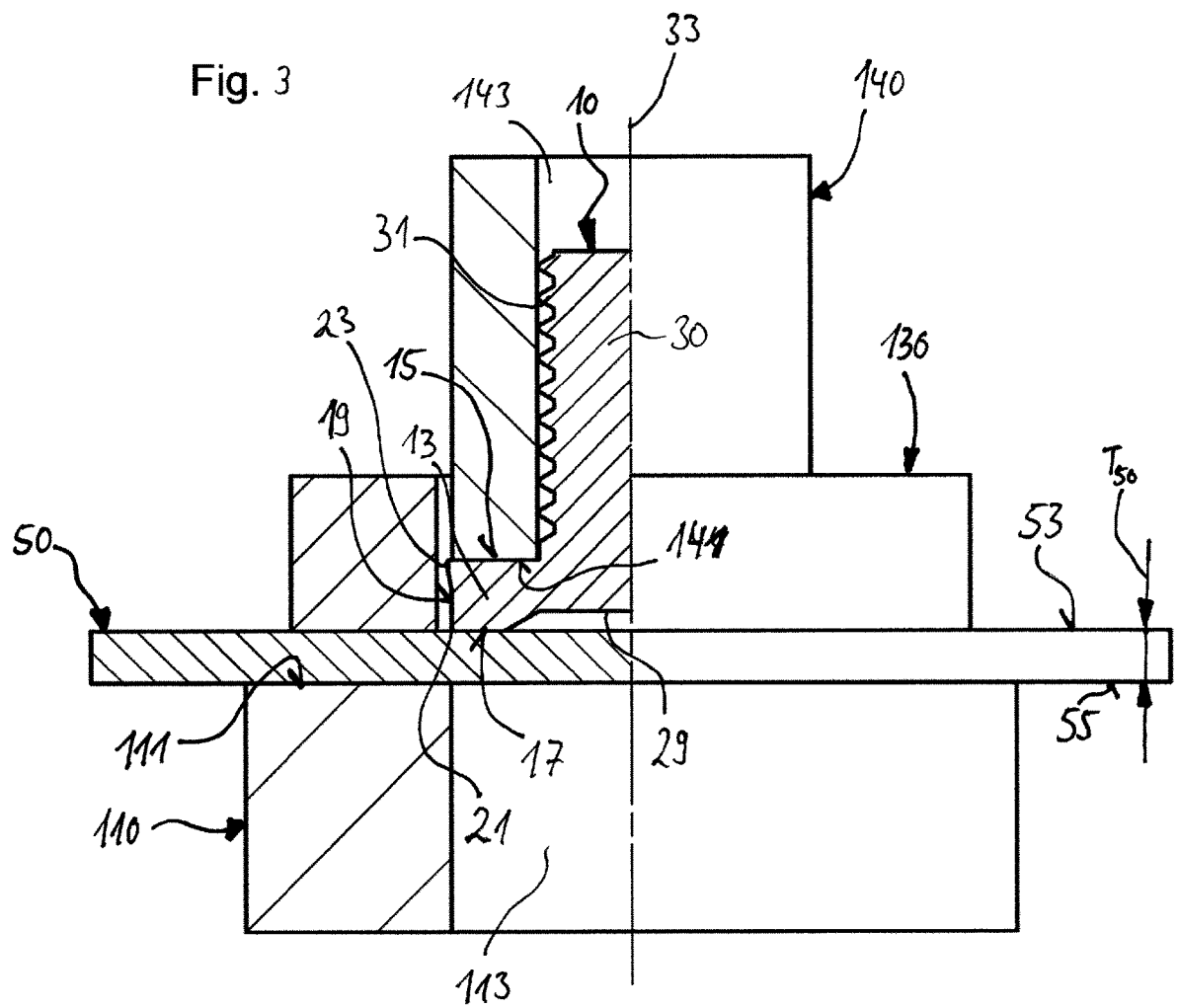
FIG. 3 shows a cross-sectional view of a functional element and of a workpiece during a method step for manufacturing a component assembly in which the functional element is pressed against the workpiece by a setting device.

FIGS. 1a and 1b each show a functional element 10 configured as a bolt element and FIG. 2 shows a functional element 10 configured as a nut element.

The functional elements 10 each comprise a functional section 11 and a fastening section 13. In the case of the functional element 10 configured as a bolt element in accordance with FIGS. 1a and 1b, the functional section 11 has a shaft 30 that is provided with an external thread 31. The functional element 10 configured as a nut element in accordance with FIG. 2, in contrast, has a central opening 32 that is provided with an internal thread 31 that is not shown in more detail.

The fastening section 13 is provided with a contact surface 15 and an end face 17 that is remote from the contact surface 15 and that has a centrally arranged recess 29. The contact surface 15 is connected to an outer peripheral surface 19, which connects the contact surface 15 and the end face 17 to one another, by means of a transition 25. In a transition region from the outer peripheral surface 19 to the end face 17, the fastening section 13 is provided with a peripheral punching edge 21 that is circular in the present example.

The functional element 10 further has, adjacent to the contact surface 15, a projection 23 that is a peripheral projection in the present example, that projects radially away from the outer peripheral surface 19, and that extends further outwardly in the radial direction than the punching edge 21. In the present embodiments, the projection 23 is conical, with the point of the maximum radial extent of the projection 23 being located at the transition 25.

The fastening section 13 is also provided with a plurality of features providing security against rotation 27 that project from the outer peripheral surface 19 and that merge into the projection 23 at their end facing the contact surface 15. This means that the radial extent of the features providing security against rotation 27 corresponds to the maximum radial extent of the projection 23. The features providing security against rotation 27 are formed as webs or ribs that extend in parallel with the longitudinal axis 33 of the functional element 10 and that are arranged at equal spacings from one another along the outer peripheral surface 19.

A method of manufacturing a component assembly 100 will be described in the following, in particular in view of FIGS. 3 to 6 and with exemplary use of the functional element 10 from FIGS. 1a and 1b.

First, the self-punching functional element 10 and a workpiece 50, in the present example a high-strength sheet metal part, are provided. As FIG. 3 clearly shows, the workpiece 50 has a first surface 53 and a second surface 55 disposed opposite the first surface 53 and is not pre-punched, at least in the region into which the functional element 10 is to be inserted. An axial extent of the fastening section 13 is in this respect greater than the thickness $T_{50}$ of the workpiece 50.

To accurately position and to securely hold the workpiece 50 during the method steps, the second surface 55 of the workpiece 50 is first placed on a die 110 such that the second surface 55 is disposed on a contact surface 111 of the die 110. The die 110 can in particular have a central recess 113 that is at least so large that a slug 51 separated on the punching, see FIG. 4, can fall through the recess 113. For this purpose, the workpiece 50 is aligned with the recess 113 with the region in which the functional element 10 is to be attached.

The workpiece 50 is pressed onto the contact surface 111 of the die 110 by means of a downholder 130 in that the downholder 130 engages at the first surface 53. The workpiece 50 is thereby securely held on the die 110 to prevent slippage during the pressing.

The functional element 10 is then pressed onto the workpiece 50 by a setting device 140 acting with a contact surface 141 on the contact surface 15 such that the end face 17 of the functional element 10 is pressed against the first surface 53 of the workpiece 50 and the punching edge 21 thereby forms a punched hole 57 in the workpiece 50 in conjunction with the acting pressing force, wherein, as FIG. 4 shows, a punched slug 51 is separated.

In the present example, as FIGS. 4 to 6 show, the pressing process takes place at least until the projection 23 enters into engagement with the first surface 53 of the workpiece 50 and an inner peripheral surface 59 of the punched hole 57. The projection 23 in this respect forms a first undercut 61 acting in the axial direction.

The setting device 140 is provided with a central recess 143 that is in particular so large that the shaft 30 of the functional element 10 can just fit therein and can be received in the recess 143. For example, the recess 143 can be designed as a bore such that the setting device 140 can receive a shaft 30 that, as in the present example, may be provided with a thread 31, but is cylindrical in its basic shape. In this case, both the contact surface 141 and the contact surface 15 are of ring-shaped design, wherein an application of force acting uniformly on the functional element 10 can be achieved.

As is clearly shown in FIGS. 5 and 6, in a next step, the fastening section 13 is formed at least in a region adjacent to the punching edge 21 to form a second undercut 63. In the present embodiment example, this takes place by means of a die plunger 120 that has a reshaping surface 121, which diverges viewed from the end face 17, and that is pressed against the end face 17 of the fastening section 13. In this respect, material of the fastening section 13 is urged radially outwardly such that the second undercut 63 that likewise acts in the axial direction is produced.

The pressing in of the functional element 10 and the formation of the second undercut 63 preferably take place directly subsequent to one another. However, it is also possible to implement these two processes in different tools, wherein the functional element 10 with the workpiece 50 are removed from the first tool after the pressing in of the functional element 10 and are transported to the second tool. The second undercut 63 is then formed in the second tool.

A downholder can likewise be used here. For example, the downholder is designed such that it simultaneously fixes the workpiece 50 and the element 10 in the axial direction.

In the component assembly 100 manufactured in this manner, the outer peripheral surface 19 of the functional element 10 contacts the inner peripheral surface 59 of the punched hole 57. The contact surface 15 is aligned approximately flush with the first surface 53 of the workpiece 50 and the projection 23 engages into the material of the workpiece 50 and into the first surface 53 and cooperates with the latter, wherein the first undercut 61 acting in the axial direction is formed. The material of the fastening section 13 displaced by means of the die plunger 120 forms the second undercut 63 that extends radially outwardly from a depression 35, which is formed at the end face 17 and is produced by the engagement of the reshaping surface 121 of the die plunger 120, and that engages behind the workpiece 50.

A secure and stable connection between the functional element 10 and the workpiece 50, in particular a high-strength sheet metal part, can thus be established by the functional element 10 shown here and the component assembly 100. Since the workpiece 50 does not have to be pre-punched and a complex welding process is obsolete, this is possible with comparatively little effort. Moreover, the component assembly 100 can be produced with a wide application range of thicknesses of the workpiece 50.

REFERENCE NUMERAL LIST

- 10 functional element
- 11 functional section
- 13 fastening section
- 15 contact surface
- 17 end face
- 19 outer peripheral surface
- 21 punching edge
- 23 projection
- 25 transition
- 27 feature providing security against rotation
- 29 recess
- 30 shaft
- 31 thread
- 32 opening
- 33 longitudinal axis
- 35 depression
- 50 workpiece
- 51 slug
- 53 first surface
- 55 second surface
- 57 punched hole
- 59 inner peripheral surface
- 61 first undercut
- 63 second undercut
- 100 component assembly
- 110 die
- 111 contact surface of the die
- 113 recess
- 120 die plunger
- 121 reshaping surface
- 130 downholder
- 140 setting device
- 141 contact surface
- 143 recess
- $T_{50}$ thickness of the workpiece

The invention claimed is:

1. A self-punching functional element for fastening to a workpiece, said self-punching functional element comprising
   a functional section; and
   a fastening section that has
   a contact surface for an engagement of a setting device,
   an end face remote from the contact surface, and
   an outer peripheral surface connecting the contact surface and the end face,
   wherein the end face is radially outwardly bounded by a punching edge for punching a slug out of the workpiece, and wherein at least one projection is provided at the outer peripheral surface adjacent to the contact surface, said projection rising from the outer peripheral surface in a radial direction and extending further outwardly in the radial direction than the punching edge and, wherein the projection is continuous in the peripheral direction.

2. The self-punching functional element in accordance with claim 1, wherein the projection is conical and/or, viewed relative to a longitudinal axis of the functional element, has an at least sectionally curved and/or slanted course.

3. The self-punching fastening element in accordance with claim 1, wherein a maximum radial extent of the projection is arranged adjacent to or adjoining a transition to the contact surface.

4. The self-punching functional element in accordance with claim 1, wherein
   the projection has an axial extent that corresponds to approximately 30% to 60% of an axial extent of the fastening section.

5. The self-punching functional element in accordance with claim 1, further comprising at least one feature providing security against rotation that is formed at the outer peripheral surface.

6. The self-punching functional element in accordance with claim 5, wherein a radial extent of the feature providing security against rotation substantially corresponds to a maximum radial extent of the projection.

7. The self-punching fastening element in accordance with claim 5, wherein a plurality of features providing security against rotation are provided that are arranged distributed in a peripheral direction at the outer peripheral surface.

8. The self-punching functional element in accordance with claim 1, wherein at least one of the contact surface and the end face is/are ring-shaped.

9. The self-punching functional element in accordance with claim 8, wherein the width of the end face ring is greater than 70% of the axial extent of the fastening section or of the axial extent of the outer peripheral surface.

10. The self-punching functional element in accordance with claim 1, wherein the end face has a recess.

11. The self-punching functional element in accordance with claim 1, wherein at least one of the fastening section and the punching edge has a geometry that deviates from a circular shape.

12. The self-punching functional element in accordance with claim 1, wherein at least two projections arranged separately from one another in the peripheral direction are provided.

13. The self-punching functional element in accordance with claim 1, wherein the functional section is provided with a thread or a latch device.

14. The self-punching functional element in accordance with claim 1, wherein the functional element is a bolt element or a nut element.

15. A component assembly that has a workpiece having a first surface, a second surface disposed opposite the first surface, and a punched hole that forms an inner peripheral surface, wherein a self-punching functional element is provided, said self-punching functional element comprising a functional section; and a fastening section that has a contact surface for an engagement of a setting device, an end face remote from the contact surface, and an outer peripheral surface connecting the contact surface and the end face, wherein the end face is radially outwardly bounded by a punching edge for punching a slug out of the workpiece, and wherein at least one projection is provided at the outer peripheral surface adjacent to the contact surface, said projection rising from the outer peripheral surface in a radial direction and extending further outwardly in the radial direction than the punching edge; and wherein said functional element is pressed into the punched hole while separating a punching slug such that the outer peripheral surface of the functional element contacts the inner peripheral surface of the punched hole and the projection engages into the first surface of the workpiece or cooperates therewith such that a first undercut acting in the axial direction is provided, wherein displaced material of the fastening section forms a second undercut engaging around the workpiece at the second surface to secure the functional element to the workpiece.

16. The component assembly in accordance with claim 15, wherein the contact surface is aligned approximately flush with the first surface.

17. The component assembly in accordance with claim 15, wherein the fastening section has a depression at the end face, from which depression the second undercut extends outwardly in the radial direction.

18. The component assembly in accordance with claim 15, wherein the fastening section has an axial extent that is greater than the thickness of the workpiece.

19. A method of manufacturing a component assembly, the component assembly having a workpiece having a first surface, a second surface disposed opposite the first surface, and a punched hole that forms an inner peripheral surface, wherein a self-punching functional element is provided, said self-punching functional element comprising:

a functional section; and a fastening section that has a contact surface for an engagement of a setting device, an end face remote from the contact surface, and an outer peripheral surface connecting the contact surface and the end face, wherein the end face is radially outwardly bounded by a punching edge for punching a slug out of the workpiece, and wherein at least one projection is provided at the outer peripheral surface adjacent to the contact surface, said projection rising from the outer peripheral surface in a radial direction and extending further outwardly in the radial direction than the punching edge; and wherein said functional element is pressed into the punched hole while separating a punching slug such that the outer peripheral surface of the functional element contacts the inner peripheral surface of the punched hole and the projection engages into the first surface of the workpiece or cooperates therewith such that a first undercut acting in the axial direction is provided, wherein displaced material of the fastening section forms a second undercut engaging around the workpiece at the second surface to secure the functional element to the workpiece, said method comprising the steps:

providing the self-punching functional element;

providing the workpiece that is not pre-punched at least in a region that is provided for fastening the functional element;

pressing the end face of the functional element against the workpiece such that a punched slug is separated from the workpiece by the punching edge while forming a punched hole, wherein the functional element is pressed into the workpiece at least until the projection enters into engagement with the first surface of the workpiece and/or with the inner peripheral surface of the punched hole to form the first undercut; and reshaping the fastening section at least in a region adjacent to the punching edge to form the second undercut.

20. The method in accordance with claim 19, wherein the functional element is pressed against the workpiece by a setting device that acts on the contact surface of the functional element.

21. The method in accordance with claim 19, wherein a downholder is provided by which the second surface of the workpiece is pressed against a contact surface of a die.

22. The method in accordance with claim 19, wherein a die plunger is provided that is pressed against the end face of the fastening section to reshape the fastening section.

23. The method in accordance with claim 19, wherein the die plunger has a reshaping surface that diverges, viewed from the end face, to urge material of the fastening section radially outwardly in order to form the second undercut in this manner.

* * * * *